US012566561B2

(12) United States Patent
 Qiu et al.

(10) Patent No.: US 12,566,561 B2
(45) Date of Patent: Mar. 3, 2026

(54) SUPER BLOCK MANAGEMENT METHOD AND APPARATUS

(71) Applicant: HUAWEI TECHNOLOGIES CO., LTD., Guangdong (CN)

(72) Inventors: Laibin Qiu, Hangzhou (CN); Wei Fang, Hangzhou (CN); Xie Miao, Hangzhou (CN); Hongjiang Zhao, Hangzhou (CN); Jie Qiu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 18/584,329

(22) Filed: Feb. 22, 2024

(65) Prior Publication Data

US 2024/0192877 A1     Jun. 13, 2024

Related U.S. Application Data

(63) Continuation of application No. PCT/CN2022/113493, filed on Aug. 19, 2022.

(30) Foreign Application Priority Data

Aug. 23, 2021     (CN) .......................... 202110971602.1

(51) Int. Cl.
 *G06F 3/06*          (2006.01)
(52) U.S. Cl.
 CPC ............ *G06F 3/064* (2013.01); *G06F 3/0604* (2013.01); *G06F 3/0679* (2013.01)
(58) Field of Classification Search
 CPC ....... G06F 3/064; G06F 3/0679; G06F 3/0608
 See application file for complete search history.

(56) References Cited

U.S. PATENT DOCUMENTS 7,631,023 B1 * 12/2009 Kaiser ..................... G06F 16/10
                                                              711/170
2009/0164536 A1 * 6/2009 Nasre .................... G06F 3/0683
                        (Continued)

FOREIGN PATENT DOCUMENTS

CN          110021326 A     7/2019
CN          111176554 A     5/2020
                        (Continued)

OTHER PUBLICATIONS

Li et al., "SRFTL: An Adaptive Superblock-Based Real-Time Flash Translation Layer for NAND Flash Memory," Proceedings of 22014 IEEE International Conference on High Performance Computing and Communications (HPCC), 2014 IEEE 6th International Symposium on Cyberspace Safety and Security (CSS) and 2014 IEEE 11th International Conference on Embedded Software and Systems (ICESS), Aug. 20-22, 2014, pp. 332-339.

(Continued)

*Primary Examiner* — Edward J Dudek, Jr.
(74) *Attorney, Agent, or Firm* — Fish & Richardson P.C.

(57)          ABSTRACT

This application discloses a super block management method and apparatus. An example method includes: obtaining a parameter of a memory and a type of target data, where the target data is data to be written into the memory; configuring a capacity of a section in a file system based on at least one of the type of the target data or the parameter of the memory, where the configured capacity of the section matches a capacity of a super block in the memory; and managing, based on the configured capacity of the section, a logical address space corresponding to the memory.

12 Claims, 7 Drawing Sheets

(56) References Cited

U.S. PATENT DOCUMENTS

| | | | | |
|---|---|---|---|---|
| 2019/0138226 A1 | | 5/2019 | Kanno et al. | |
| 2019/0212940 A1 * | | 7/2019 | Cai | G06F 3/0649 |
| 2019/0332581 A1 * | | 10/2019 | Wang | G06F 3/0643 |
| 2020/0218648 A1 | | 7/2020 | Kanno | |
| 2021/0019074 A1 * | | 1/2021 | Akin | G06F 3/0685 |
| 2021/0181940 A1 * | | 6/2021 | Cui | G06F 12/0246 |
| 2021/0365200 A1 * | | 11/2021 | Alwala | G06F 3/0604 |
| 2022/0261182 A1 * | | 8/2022 | Galenchik | G06F 12/0246 |
| 2022/0342544 A1 * | | 10/2022 | Cariello | G06F 12/0246 |
| 2022/0413699 A1 * | | 12/2022 | Luo | G06F 11/07 |

FOREIGN PATENT DOCUMENTS

| | | |
|---|---|---|
| CN | 111984186 A | 11/2020 |
| CN | 112055850 A | 12/2020 |

OTHER PUBLICATIONS

International Search Report and Written Opinion in International Appln. No. PCT/CN2022/113493, mailed on Nov. 17, 2022, 17 pages (with English translation).
Extended European Search Report in European Appln. No. 22860392.4, mailed on Nov. 7, 2024, 14 pages.

* cited by examiner

| | |
|---|---|
| Obtain a parameter of a memory and a type of target data, where the target data is data to be written into the memory | S310 |

| | |
|---|---|
| Configure a capacity of a section in a file system based on the type of the target data and/or the parameter, where the section is a logical address space management unit in the file system, and the configured capacity of the section matches a capacity of a super block in the memory | S320 |

| | |
|---|---|
| Manage, based on the configured capacity of the section, a logical address space corresponding to the memory | S330 |

FIG. 3

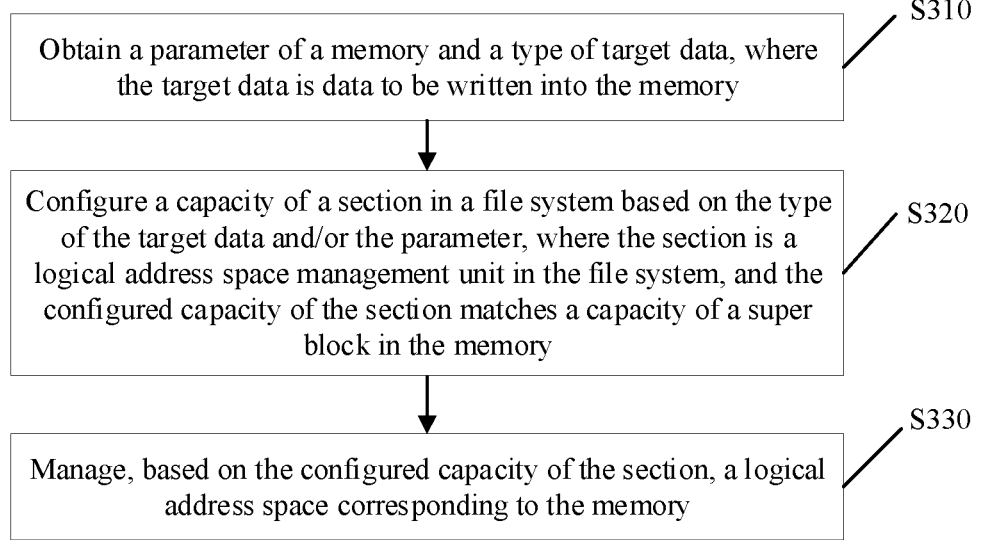

SUPER BLOCK MANAGEMENT METHOD AND APPARATUS

CROSS-REFERENCE TO RELATED APPLICATIONS

This application is a continuation of International Application No. PCT/CN2022/113493, filed on Aug. 19, 2022, which claims priority to Chinese Patent Application No. 202110971602.1, filed on Aug. 23, 2021. The disclosures of the aforementioned applications are hereby incorporated by reference in their entireties.

TECHNICAL FIELD

This application relates to the field of information technologies, and in particular, to a super block management method and apparatus.

BACKGROUND

Currently, a general-purpose architecture of a computer device, for example, a terminal device, includes a file system (for example, a flash-friendly file system (F2FS)) and a universal memory (for example, a universal flash storage (UFS) and an embedded multi-media card (EMMC)). The file system and the memory run independently without any coupling. The file system is configured to manage a logical address space. The memory is configured to store application layer data.

In a current flash-based memory, due to a physical limitation of flash page programming block erasing, valid data in a super block needs to be reclaimed according to a garbage collection (GC) algorithm, to release the super block for writing of subsequent data. Currently, the industry has put forward some new architectures that streamline two layers of GC respectively corresponding to the memory and the file system into one layer of GC, for example, unified storage and zoned name spaces (ZNS), to reduce write amplification caused by the two layers of GC.

However, in an existing architecture, a probability that a critical request is blocked on a memory side is high. In addition, with improvement of a future memory process, in the foregoing architecture with one layer of GC, a capacity of a physical block on a single die (die) in the memory increases significantly. As a result, a capacity of the super block (Super Block) also increases significantly. However, an excessively large super block increases a GC load, and severely affects performance of the memory.

SUMMARY

Embodiments of this application provide a super block management method and apparatus. A size of a super block may be dynamically configured to reduce a probability that a critical request is blocked and impact of an excessively large super block on storage performance, to improve overall performance.

According to a first aspect, this application provides a super block management method. The method includes: obtaining a parameter of a memory and a type of target data, where the target data is data to be written into the memory; configuring a capacity of a section in a file system based on the type of the target data and/or the parameter, where the section is a logical address space management unit in the file system, and the configured capacity of the section matches a capacity of a super block in the memory; and managing, based on the configured capacity of the section, a logical address space corresponding to the memory.

The type of the target data may be hot data, warm data, and cold data. The section is a unit of a logical address space managed by the file system.

Optionally, the foregoing embodiment may be implemented by running the file system on a processor.

From the perspective of technical effects, compared with the conventional technology in which the capacity of the section is constant, in this embodiment of this application, the capacity of the section may be dynamically adjusted based on different scenarios (corresponding to different types of the target data and/or different parameters of the memory). The capacity of the section matches the capacity of the super block in the memory, so that when the capacity of the section is dynamically configured, the capacity of the super block in the memory is synchronously adjusted, to meet requirements of different scenarios. In this way, overall performance is improved. For example, with improvement of a manufacturing process in the future, the capacity of the super block continuously increases when the conventional technology is used for super block management, and a quantity of idle super blocks is continuously reduced under a condition that a capacity of the memory is constant. In this embodiment of this application, the capacity of the super block in the memory may be synchronously reduced by reducing the capacity of the section. In this way, a quantity of redundant blocks (that is, super blocks in redundant space (OP)) in the memory is increased, and the overall performance is improved.

In a feasible implementation, the memory includes at least one die (die). Each of the at least one die includes at least one physical block. The super block is a management unit in the memory. The super block includes at least one physical block. Each of the at least one physical block is located on a different die.

It should be understood that the capacity of the section is equal to the capacity of the super block in the memory, and the super block includes at least one physical block. Therefore, the capacity of the section corresponds to at least one physical block in the memory. In other words, the capacity of the section is equal to a product of a quantity of physical blocks, in the memory, corresponding to the capacity of the section and a capacity of a single physical block.

The die and the physical block on the die are hardware structures in the memory. The super block is a logical structure in the memory.

In a feasible implementation, the parameter includes a quantity of idle super blocks in the memory and a quantity of dies. When the quantity of idle super blocks is less than or equal to a preset quantity, a quantity of physical blocks, in the memory, corresponding to the configured capacity of the section is less than the quantity of dies.

From the perspective of technical effects, when the quantity of idle super blocks in the memory is less than or equal to the preset quantity, a data read/write process in the memory is seriously affected. In this embodiment of this application, the capacity of the section may be dynamically configured. For example, the capacity of the section is reduced, so that the quantity of physical blocks, in the memory, corresponding to the capacity of the section is less than the quantity of dies, that is, the capacity of the super block in the memory is synchronously reduced. In this way, the quantity of redundant blocks in the memory is increased, and the overall performance is improved.

In a feasible implementation, the parameter includes a quantity of idle super blocks in the memory and a quantity of dies. When the quantity of idle super blocks is greater than a preset quantity, a quantity of physical blocks, in the memory, corresponding to the configured capacity of the section is less than or equal to the quantity of dies.

Optionally, when the type of the target data is hot data, the quantity of physical blocks, in the memory, corresponding to the capacity of the section is equal to the quantity of dies; or when the type of the target data is warm data or cold data, the quantity of physical blocks, in the memory, corresponding to the capacity of the section is less than the quantity of dies.

From the perspective of technical effects, in the conventional technology, sizes of super blocks, in the memory, respectively corresponding to a critical request (that is, a hot data read/write request) and a non-critical request (that is, a warm data or cold data read/write request) are the same, that is, quantities of physical blocks included in the super blocks each are equal to the quantity of dies. As a result, when the critical request is inserted for processing before the non-critical request, there is a high probability that the two requests fall on a same die, causing blocking of the critical request. In this embodiment of this application, for the non-critical request, the capacity of the section may be configured to a small value, that is, a quantity of physical blocks included in the super block in the memory is less than the quantity of dies. For the critical request, the capacity of the section may be configured to a large value, that is, a quantity of physical blocks included in the super block in the memory is equal to the quantity of dies. Therefore, when the critical request is inserted for processing before the non-critical request, because the quantities of physical blocks included in the super blocks, in the memory, respectively corresponding to the two requests are different, there is a low probability that the two requests fall on a same die. In other words, in this embodiment of this application, a probability that the critical request is blocked may be reduced.

In a feasible implementation, the managing, based on the configured capacity of the section, a logical address space corresponding to the memory includes: determining E configured sections from the logical address space corresponding to the memory, where the E configured sections respectively correspond to E super blocks in the memory; and indieating the processor to reclaim data in the E super blocks to F idle super blocks, where E is greater than F, and E and F are positive integers.

From the perspective of technical effects, the capacity of the section in the file system is configured, and in a process in which the memory performs GC based on the capacity of the section, when the quantity of physical blocks corresponding to the configured capacity of the section in the file system is less than the quantity of dies, compared with the conventional technology in which the quantity of physical blocks corresponding to the capacity of the section is equal to the quantity of dies, when a same quantity of idle super blocks are released, in this embodiment of this application, a quantity of times of valid data migration may be reduced by reducing the capacity of the super block in the memory. Alternatively, when a same amount of valid data is migrated, in this embodiment of this application, because the capacity of the super block is small, more super blocks may be released, that is, efficiency of releasing a redundant block in the GC process is improved. In this way, the overall performance is improved.

In a feasible implementation, the managing, based on the configured capacity of the section, a logical address space corresponding to the memory includes: determining K configured sections from the logical address space corresponding to the memory, where the K configured sections respectively correspond to K super blocks in the memory; and indieating the memory to write the target data into the K super blocks, where K is a positive integer.

From the perspective of technical effects, the capacity of the section in the file system is configured, and the memory performs a process of writing the target data based on the capacity of the section. When writing the target data is a critical request that is inserted, it may be learned from the foregoing embodiment that in this embodiment of this application, a blocking probability during writing of the target data may be reduced.

According to a second aspect, this application provides a super block management apparatus. The apparatus includes: an obtaining unit, configured to obtain a parameter of a memory and a type of target data, where the target data is data to be written into the memory; a configuration unit, configured to configure a capacity of a section in a file system based on the type of the target data and/or the parameter, where the section is a logical address space management unit in the file system, and the configured capacity of the section matches a capacity of a super block in the memory; and a management unit, configured to manage, based on the configured capacity of the section, a logical address space corresponding to the memory.

In a feasible implementation, the memory includes at least one die (die). Each of the at least one die includes at least one physical block. The super block is a management unit in the memory. The super block includes at least one physical block. Each of the at least one physical block is located on a different die.

In a feasible implementation, the parameter includes a quantity of idle super blocks in the memory and a quantity of dies. When the quantity of idle super blocks is less than or equal to a preset quantity, a quantity of physical blocks, in the memory, corresponding to the configured capacity of the section is less than the quantity of dies.

In a feasible implementation, the parameter includes a quantity of idle super blocks in the memory and a quantity of dies. When the quantity of idle super blocks is greater than a preset quantity, a quantity of physical blocks, in the memory, corresponding to the configured capacity of the section is less than or equal to the quantity of dies.

In a feasible implementation, the management unit is specifically configured to: determine E configured sections from the logical address space corresponding to the memory, where the E configured sections respectively correspond to E super blocks in the memory; and indieate a processor to reclaim data in the E super blocks to F idle super blocks, where E is greater than F, and E and F are positive integers.

In a feasible implementation, the management unit is specifically configured to: determine K configured sections from the logical address space corresponding to the memory, where the K configured sections respectively correspond to K super blocks in the memory; and indieate the memory to write the target data into the K super blocks, where K is a positive integer.

According to a third aspect, this application provides a computer device. The computer device includes a processor and a memory. The processor is configured to: obtain a parameter of the memory and a type of target data, where the target data is data to be written into the memory; configure a capacity of a section in a file system based on the type of the target data and/or the parameter, where the section is a logical address space management unit in the file system, and the configured capacity of the section matches a capacity of a super block in the memory; and manage, based on the configured capacity of the section, a logical address space corresponding to the memory.

In a feasible implementation, the memory includes at least one die (die). Each of the at least one die includes at least one physical block. The super block is a management unit in the memory. The super block includes at least one physical block. Each of the at least one physical block is located on a different die.

In a feasible implementation, the parameter includes a quantity of idle super blocks in the memory and a quantity of dies. When the quantity of idle super blocks is less than or equal to a preset quantity, a quantity of physical blocks, in the memory, corresponding to the capacity of the section is less than the quantity of dies.

In a feasible implementation, the parameter includes a quantity of idle super blocks in the memory and a quantity of dies. When the quantity of idle super blocks is greater than a preset quantity, a quantity of physical blocks, in the memory, corresponding to the configured capacity of the section is less than or equal to the quantity of dies.

In a feasible implementation, in the aspect of managing, based on the configured capacity of the section, the logical address space corresponding to the memory, the processor is specifically configured to determine E configured sections from the logical address space corresponding to the memory. The E configured sections respectively correspond to E super blocks in the memory. The memory is configured to reclaim data in the E super blocks to F idle super blocks. E is greater than F. E and F are positive integers.

In a feasible implementation, in the aspect of managing, based on the configured capacity of the section, the logical address space corresponding to the memory, the processor is specifically configured to determine K configured sections from the logical address space corresponding to the memory. The K configured sections respectively correspond to K super blocks in the memory. The memory is configured to write the target data into the K super blocks. K is a positive integer.

According to a fourth aspect, this application provides a chip system. The chip system includes at least one processor, a memory, and an interface circuit. The memory, the interface circuit, and the at least one processor are connected to each other through a line. The at least one memory stores instructions. When the instructions are executed by the processor, the method in the first aspect is implemented.

According to a fifth aspect, this application provides a computer-readable storage medium. The computer-readable storage medium stores program instructions. When the program instructions run on one or more processors, the method in the first aspect is implemented.

According to a sixth aspect, this application provides a computer program product. When the computer program product runs on a computer device, the method in the first aspect is implemented.

BRIEF DESCRIPTION OF DRAWINGS

The following describes the accompanying drawings used in embodiments of this application.

FIG. 3 is a schematic flowchart of a super block management method according to an embodiment of this application;

FIG. 4 is a schematic diagram of a correspondence between a logical address space and a memory according to an embodiment of this application;

DESCRIPTION OF EMBODIMENTS

Figure 1:
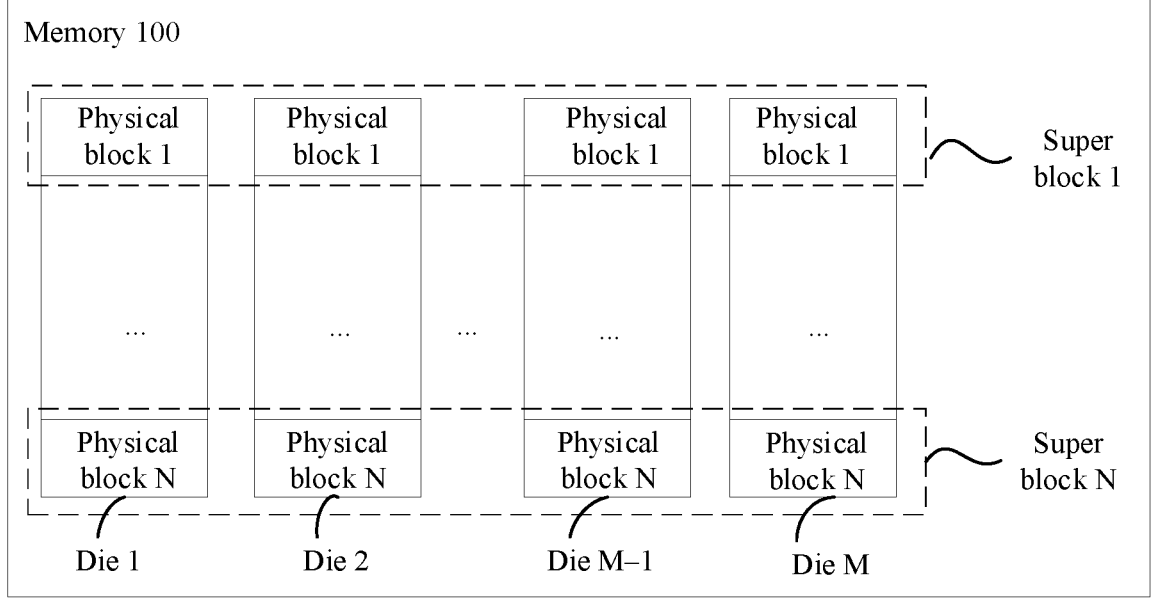
FIG. 1 is a schematic diagram of a structure of a memory according to the conventional technology.

The following describes embodiments of this application with reference to the accompanying drawings in embodiments of this application.

In the specification, claims, and accompanying drawings of this application, terms "first", "second", "third", "fourth", and the like are intended to distinguish between different objects but do not indicate a particular order. In addition, terms "include" and "have" and any variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, the method, the product, or the device. "Embodiment" mentioned in this specification means that a particular feature, structure, or characteristic described with reference to this embodiment may be included in at least one embodiment of this application. The phrase shown in various locations in this specification may not necessarily refer to a same embodiment, and is not an independent or optional embodiment exclusive from another embodiment. It is explicitly and implicitly understood by persons skilled in the art that embodiments described in this specification may be combined with another embodiment.

Terms "part", "module", "system", and the like used in this specification are intended to indicate a computer-related entity, hardware, firmware, a combination of hardware and software, software, or software in execution. For example, a part may be but is not limited to a process that runs on a processor, the processor, an object, an executable file, an execution thread, a program, and/or a computer. As illustrated by using figures, both an application that runs on a computing device and the computing device may be parts. One or more parts may reside within a process and/or an execution thread, and a part may be located on one computer and/or distributed between two or more computers. In addition, these parts may be implemented by various computer-readable media that store various data structures. The parts may communicate through local and/or remote processes based on, for example, a signal with one or more data packets (for example, data from two parts, in a local system, a distributed system, and/or a network, interacting with the other part, for example, the internet interacting with another system by using the signal).

The following describes embodiments of this application with reference to the accompanying drawings in embodiments of this application.

Related terms in embodiments of this application are first explained.

(1) Flash (flash): It is also referred to as a non-volatile memory. Data may be written and erased for a plurality of times, and can be retained for a long time without current and voltage supply.

(2) File system: It is a software organization that manages and stores file information in an operating system. The file system has functions of: managing and scheduling storage space of a file, providing a logical structure, a physical structure, and a storage method of the file, implementing mapping of the file from an identifier to an actual address, implementing file control and access operations, implementing file information sharing, providing reliable file confidentiality and protection measures, and providing a file security measure.

(3) GC algorithm (that is, garbage collection (GC) algorithm): This algorithm is used to migrate a valid page in a block to another idle block, so that the block from which the valid data is transferred is idle for subsequent writing.

(4) OP (that is, over provisioning): It may be referred to as redundant space or reserved space. OP is a capacity of a memory that cannot be operated by a user, whose value is an actual capacity of the memory minus a capacity available to the user. An OP region is generally used for optimization operations, for example, GC. An OP block (or referred to as a redundant block) is a super block included in the redundant space. A larger quantity of OP blocks indicates a higher GC load.

(5) Section: It is a block management unit on a file system side. In a flash file system (Flash File System), a capacity of the section on the file system side corresponds to that of a super block (Super block) in the memory. In an F2FS, a section is section in three logical address space management units (zone, section, and segment) included in the F2FS.

(6) Super block (super block): It is a minimum management unit in the memory, which is a logical structure division of the memory. The memory performs data read/write, garbage collection, and other operations based on super blocks.

FIG. 1 is a schematic diagram of a structure of a memory 100 according to the conventional technology. The memory 100 may be any one of memories such as a random access memory (RAM), a read-only memory (ROM), or a flash memory (Flash Memory). The RAM includes a static random access memory (SRAM), a dynamic random access memory (DRAM), and the like. The ROM includes an erasable programmable ROM (EPROM), an electrically erasable programmable read-only memory (EEPROM), and the like.

As shown in FIG. 1, the memory 100 may include M flash dies (flash dies). Each die is an independent concurrent unit. Each die may include N physical blocks (blocks). To improve performance, one physical block is usually selected from each die to form a super block (a super block 1 and a super block N in FIG. 1). All physical blocks forming a super block may be concurrent. The super block is used as a minimum operation unit on a memory side. A size of the super block remains unchanged in a subsequent running process. M and N are positive integers.

The memory 100 maintains a queue during request processing. Requests delivered by a host are arranged in the queue in sequence. A high-priority critical request may be inserted to a header of a low-priority non-critical request and then processed in serial according to a first in first out principle.

Optionally, the memory 100 may be a universal flash storage UFS, an embedded multi-media card EMMC, or the like in a computer device such as a mobile phone. This is not limited in this solution. In unified storage, ZNS, and other architectures, core algorithms such as a GC algorithm and a block management algorithm under the flash translation layer (FTL) may be handed over to a kernel for management, an overall FTL policy remains unchanged, and composition of the super block remains unchanged. In this way, GC on the memory side and GC on a file system side are streamlined into one layer of GC.

However, with improvement of a manufacturing process, a memory such as a flash memory will evolve towards a higher density in the future, which is represented as an increase of a quantity of stacking layers and an increase of a storage capacity of a single storage unit, so that a capacity of a single physical block also increases significantly. Currently, a super block on the memory side includes one physical block on each die. Therefore, when the capacity of a single physical block increases in the future, a capacity of a single super block also increases significantly. An excessively large super block increases a quantity of times that valid data is repeatedly written in a GC process, that is, increases a GC load, affecting an overall throughput of the memory. Especially, at an end of capacity (a quantity of idle super blocks is less than or equal to a preset quantity), each super block stores much valid data, and additional overheads brought by data migration in the GC algorithm are further amplified.

In addition, if the host delivers a high-priority critical request when the memory is processing a low-priority non-critical request, the high-priority critical request is arranged at a header of the low-priority non-critical request. In this case, the low-priority non-critical request is being processed, so that there is a high probability that the two requests are on a same die. However, only one request may be processed on a single die at a time. Therefore, although arranged before the low-priority non-critical request, the high-priority critical request can be processed only after the low-priority non-critical request is processed. As a result, the high-priority critical request is blocked.

Figure 2:
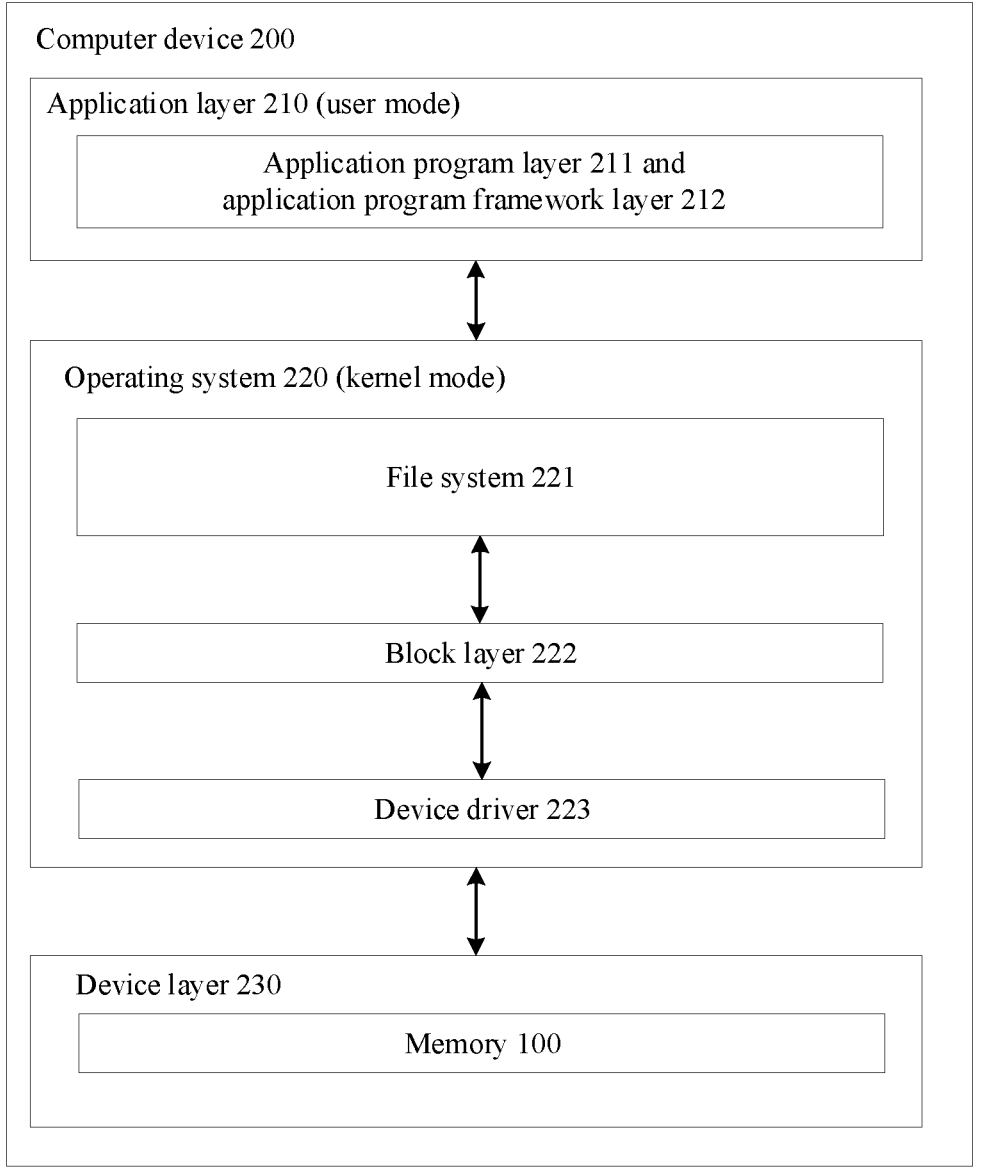
FIG. 2 is a schematic block diagram of a system architecture according to an embodiment of this application.

FIG. 2 is a schematic block diagram of a system architecture according to an embodiment of this application, to describe a system architecture of a computer device 200. As shown in FIG. 2, the system architecture of the computer device 200 may include an application layer 210, an operating system 220, and a device layer 230.

Optionally, the computer device 200 may be a mobile phone, a computer, a tablet, a wearable device, or the like. This is not limited in this application.

Optionally, the application layer 210 may include an application program layer 211 and an application program framework layer 212. The application program layer 211 may include a series of application program packages. The application program packages may include application programs (or referred to as applications) such as Camera, Gallery, Calendar, Phone, Maps, Navigation, WLAN, Bluetooth, Music, Videos, and Messages. The application program framework layer 212 provides an application programming interface (API) and a programming framework for the application program at the application program layer. The application program framework layer includes some predefined functions.

Optionally, the operating system 220 may include a file system 221, a block layer 222, and a device driver 223. The file system 221 is configured to manage and schedule storage space of a file, and provide a logical structure, a physical structure, and a storage method of the file. The block layer 222 is an interface for the file system 221 to access the device layer 230, and is configured to connect the file system 221 to the device driver 223. The block layer 222 may be divided into two layers: one is a bio layer, and the other is a request layer. The block layer 222 is configured to encapsulate/decapsulate a related request. The device driver 223 may include a display driver, a camera driver, an audio driver, a sensor driver, and the like.

Optionally, the device layer 230 may include a memory 100.

In some feasible implementations, a program may run in a user mode and a kernel mode. When the program runs in the user mode, a processor can access only some data in the memory, and is not allowed to access a peripheral device such as a hard disk or a network adapter. When the program runs in the kernel mode, a processor may access all data in the memory, including a peripheral device such as a hard disk or a network adapter. In addition, the processor may also switch from one program to another program. Generally, the application program in the application layer 210 runs in the user mode, and the operating system 220 runs in the kernel mode.

In a running process of the computer device 200, the application layer 210 first initiates a read/write request. The file system 221 determines a logical address of data corresponding to the read/write request in the memory 100. The block layer 222 is configured to distribute the read/write request to the device driver 223. The device driver 223 is configured to encapsulate the read/write request, and send the encapsulated read/write request and the logical address corresponding to the read/write request to the memory 100. The memory 100 decapsulates the encapsulated read/write request, and converts the logical address corresponding to the read/write request into a corresponding physical address in the memory 100. Then, based on the read/write request, data is written into the physical address or data is read from the physical address.

FIG. 3 is a schematic flowchart of a super block management method according to an embodiment of this application. As shown in FIG. 3, the method 300 may include steps S310, S320, and S330.

Step S310: Obtain a parameter of a memory and a type of target data, where the target data is data to be written into the memory.

Step S320: Configure a capacity of a section in a file system based on the type of the target data and/or the parameter, where the section is a logical address space management unit in the file system, and the configured capacity of the section matches a capacity of a super block in the memory.

Step S330: Manage, based on the configured capacity of the section, a logical address space corresponding to the memory.

The type of the target data may be any one of cold data (Cold data), warm data (Warm data), or hot data (Hot data), or any data type in other data type division manners. The memory may be the memory 100 in the embodiment corresponding to FIG. 1.

The parameter of the memory may include a quantity of idle super blocks in the memory and a quantity of dies (dies) in the memory (as shown in the memory in FIG. 1, the quantity of dies is M).

Optionally, the operations in steps S310, S320, and S330 may be implemented by a processor by running the file system.

The file system may be a flash file system (Flash File System) or any one of other feasible file systems. The flash file system may include a journaling flash file system version 2 (JFFS2), a YAFFS (YAFFS), a flash-friendly file system (F2FS), and the like.

Different file systems may use different hierarchical management units to manage corresponding logical address spaces. Optionally, for example, the F2FS may include three hierarchical management units for the logical address space: zone, section, and segment. Each zone may include at least one section, and each section may include at least one segment.

Specifically, FIG. 4 is a schematic diagram of a correspondence between a logical address space and a memory according to an embodiment of this application. As shown in FIG. 4, a logical address space layout of the file system includes three hierarchical management units in total: zone (zone), section (section), and segment (segment). Each zone includes N sections. Each section includes M segments (that is, a section 1 includes a segment 1-1, . . . , and a segment 1-M, and a section N includes a segment N–1, . . . , and a segment N–M). A basic management unit in the memory is the super block. A capacity of a section in the logical address space is the same as a capacity of a corresponding super block in the memory, that is, the section 1 matches a super block 1, and the section N matches a super block N. M and N are positive integers.

It should be understood that in FIG. 4, one zone in the F2FS is used as an example to describe the correspondence between the logical address space managed by the file system and the memory. Different file systems may use different hierarchical management units to manage the corresponding logical address spaces. The section is a management unit included in each file system, and a capacity of the management unit is the same as a capacity of a corresponding super block on a memory side. In addition, the logical address spaces managed by the file system may include the logical address space corresponding to the memory.

Specifically, there may be two cases for configuration of the capacity of the section in the file system based on the type of the target data and/or the parameter in step S320.

(1) When the memory is at an end of capacity (that is, the quantity of idle super blocks in the memory is less than or equal to a preset quantity), the capacity of the section in the file system is configured based on the parameter of the memory.

(2) When the memory is not at an end of capacity (that is, the quantity of idle super blocks in the memory is greater than a preset quantity), the capacity of the section in the file system is configured based on the type of the target data and the parameter of the memory.

Specifically, in step S330, managing, based on the configured capacity of the section, the logical address space corresponding to the memory may include:

configuring the capacity of the section in the file system based on a specific application scenario (determined based on the type of the target data and the parameter of the memory), and dividing the logical address space corresponding to the memory by using the configured capacity of the section as a unit, where the configured capacity of the section matches the capacity of the super block in the memory, and the memory performs data read/write and other operations by using the super block as a basic unit. Therefore, in this embodiment of this application, the capacity of the super block in the memory is synchronously adjusted by dynamically configuring the capacity of the section in the file system, and the memory is indicated to perform data read/write, garbage collection GC, and other operations in units of adjusted super blocks.

From the perspective of technical effects, compared with the conventional technology in which the capacity of the section is constant, in this embodiment of this application, the capacity of the section may be dynamically adjusted based on different scenarios (corresponding to different types of the target data and/or different parameters of the memory). The capacity of the section matches the capacity of the super block in the memory, so that when the capacity of the section is dynamically configured, the capacity of the super block in the memory is synchronously adjusted, to meet requirements of different scenarios. In this way, overall performance is improved. For example, with improvement of a manufacturing process in the future, the capacity of the super block continuously increases when the conventional technology is used for super block management, and the quantity of idle super blocks is continuously reduced under a condition that the capacity of the memory is constant. In this embodiment of this application, the capacity of the super block in the memory may be synchronously reduced by reducing the capacity of the section. In this way, a quantity of redundant blocks (that is, super blocks in redundant space (OP)) in the memory is increased, and the overall performance is improved.

In a feasible implementation, the memory includes at least one die (die). Each of the at least one die includes at least one physical block. A management unit in the memory is the super block. The super block includes at least one physical block. Each of the at least one physical block is located on a different die.

It should be understood that the capacity of the section is equal to the capacity of the super block in the memory, and the super block includes at least one physical block. Therefore, the capacity of the section corresponds to at least one physical block in the memory. In other words, the capacity of the section is equal to a product of a quantity of physical blocks, in the memory, corresponding to the capacity of the section and a capacity of a single physical block.

Specifically, as shown in FIG. 1, the memory includes at least M dies (dies), and each die includes N physical blocks (blocks). The super block is a basic management unit in the memory, that is, the memory performs data read/write and other operations in units of super blocks. A size of a logical address space corresponding to each super block matches, that is, is consistent with, a size of a logical address space corresponding to each section (section). Each super block includes at least one physical block, and the at least one physical block is located on different dies.

In a feasible implementation, the parameter includes a quantity of idle super blocks in the memory and a quantity of dies. When the quantity of idle super blocks is less than or equal to a preset quantity, a quantity of physical blocks, in the memory, corresponding to the capacity of the section is less than the quantity of dies.

In a feasible implementation, the parameter includes a quantity of idle super blocks in the memory and a quantity of dies. When the quantity of idle super blocks is greater than a preset quantity, a quantity of physical blocks, in the memory, corresponding to the configured capacity of the section is less than or equal to the quantity of dies.

The idle super block is a super block that does not include any data. The idle super block may be located in storage space visible to a user or redundant space OP.

The preset quantity may be a value that is set based on a specific scenario. This is not limited in this application.

Specifically, there may be two cases for configuration of the capacity of the section in the file system based on the type of the target data and/or the parameter.

(1) When the memory is at the end of capacity (that is, the quantity of idle super blocks in the memory is less than or equal to the preset quantity), the capacity of the section in the file system is configured based on the parameter (the quantity of dies herein) of the memory, so that the quantity of physical blocks, in the memory, corresponding to the configured capacity of the section is less than the quantity of dies. The size of the logical address space corresponding to each section is consistent with the size of the logical address space corresponding to the super block in the memory, so that the capacity of the super block in the memory changes synchronously with the capacity of the section. That is, in this case, the quantity of physical blocks included in each super block in the memory is less than the quantity of dies in the memory. In this manner, a quantity of redundant blocks in the memory is increased, and a quantity of times of valid data migration in a GC reclamation process is reduced, so that performance of a computer device is improved.

From the perspective of technical effects, when the quantity of idle super blocks in the memory is less than or equal to the preset quantity, a data read/write process in the memory is seriously affected. In this embodiment of this application, the capacity of the section may be dynamically configured. For example, the capacity of the section is reduced, so that the quantity of physical blocks, in the memory, corresponding to the capacity of the section is less than the quantity of dies, that is, the capacity of the super block in the memory is synchronously reduced. In this way, the quantity of redundant blocks in the memory is increased, and the overall performance is improved.

(2) When the memory is not at the end of capacity (that is, the quantity of idle super blocks in the memory is greater than the preset quantity), the capacity of the section is configured based on the type of the target data and the parameter (the quantity of dies herein) of the memory. Optionally, a configuration manner in this case may be as follows: When the type of the target data is hot data (a critical request), the capacity of the section is configured, so that the quantity of physical blocks, in the memory, corresponding to the configured capacity of the section is equal to the quantity of dies, that is, a quantity of physical blocks included in the super block in the memory is equal to the quantity of dies in the memory. In this scenario, in this application, a performance requirement of hot data may be met by synchronously increasing the capacities of the section and the super block. When the type of the target data is warm data or cold data (a non-critical request), the capacity of the section is configured, so that the quantity of physical blocks that is in the memory and that correspond to the configured capacity of the section is less than the quantity of dies, that is, a quantity of physical blocks included in the super block in the memory is less than the quantity of dies in the memory.

From the perspective of technical effects, in this scenario with a low performance requirement, the capacity of the section and the capacity of the super block may be configured to a small value. Therefore, when the critical request (that is, a hot data read/write request) is inserted into a request queue maintained by the memory, because the critical request and the non-critical request correspond to different quantities of physical blocks in the memory, a probability that the critical request is blocked may be effectively reduced, and data read/write performance may be further improved.

Figure 5:
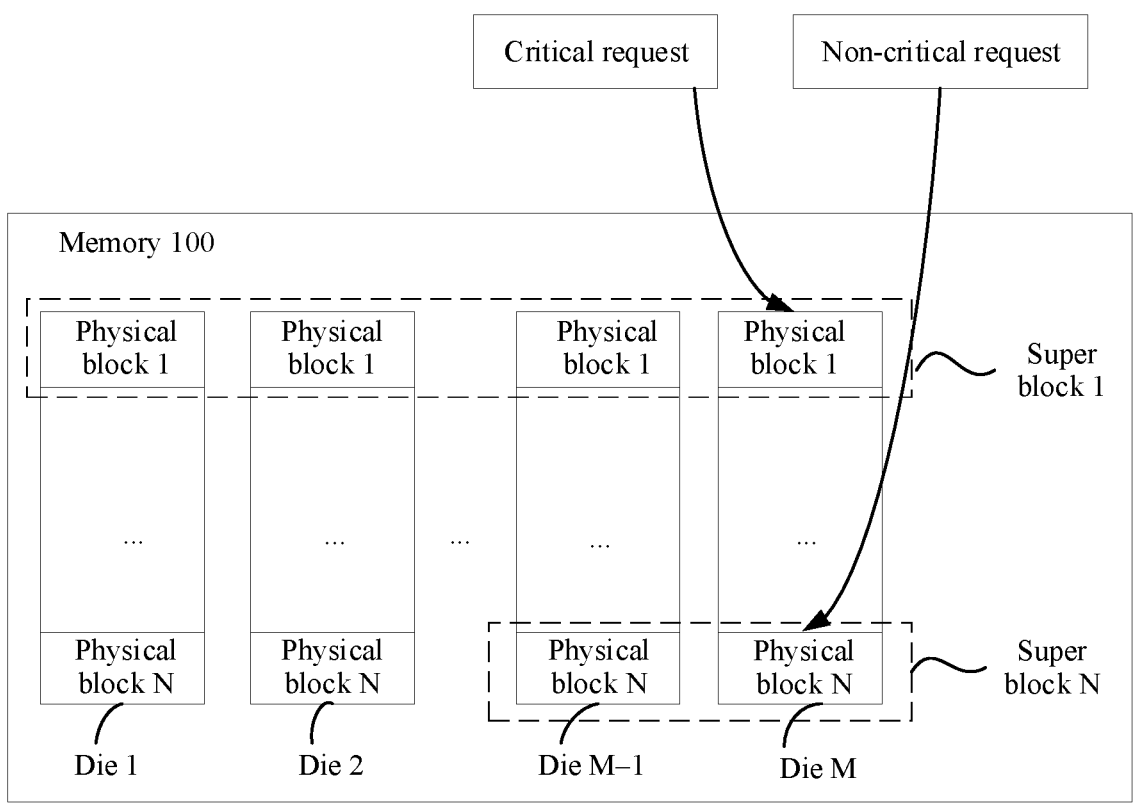
FIG. 5 is a schematic diagram of a request blocking process according to an embodiment of this application.

The following describes a request blocking process with reference to FIG. 5. FIG. 5 is a schematic diagram of the request blocking process according to an embodiment of this application. As shown in FIG. 5, a request blocking scenario may be as follows: A request currently processed by the memory 100 is the non-critical request (corresponding to cold data or warm data), and a current processing process of the non-critical request is in a physical block N on an $M^{th}$ die. In this case, if a high-priority critical request (corresponding to hot data) is inserted into the request queue maintained by the memory, the memory suspends processing of the non-critical request, and starts to process the critical request. When the critical request is also processed on the $M^{th}$ die, because only one request can be processed a same die at a time, processing of the critical request is blocked.

In the conventional technology, sizes of super blocks respectively corresponding to the critical request and the non-critical request are the same, and quantities of physical blocks in the super blocks each are equal to the quantity of dies. As a result, when the critical request is inserted for processing before the non-critical request, there is a high probability that the two requests fall on a same die.

However, in this embodiment of this application, the capacity of the section in the file system may be dynamically configured, that is, the critical request and the non-critical request correspond to super blocks of different capacities. As shown in FIG. 5, optionally, the super block corresponding to the critical request includes a physical block 1 on each die, M physical blocks in total, and the super block corresponding to the non-critical request includes a physical block N on an $(M-1)^{th}$ die and the physical block N on the $M^{th}$ die, two physical blocks in total. The quantities of physical blocks included in the super blocks respectively corresponding to the critical request and the non-critical request are different, so that when the critical request is inserted for processing before the non-critical request, the probability that the two requests fall on the same die is greatly reduced. In other words, in this embodiment of this application, the probability that the critical request is blocked may be effectively reduced.

Table 1 is a table of the probability that the critical request is blocked under different capacity ratios of the section. The quantity of dies in the memory is 4. In this case, the super block corresponding to the configured capacity of the section in the file system includes a maximum of four physical blocks and a minimum of one physical block. In Table 1, a horizontal direction indicates a quantity of physical blocks included in the super block corresponding to a capacity of the section configured for the critical request. In Table 1, a vertical direction indicates a quantity of physical blocks included in the super block corresponding to a capacity of the section configured for the non-critical request.

As shown in Table 1, when the quantity of physical blocks included in the super block for the critical request is the same as the quantity of physical blocks included in the super block for the non-critical request, the probability that the critical request is blocked is 100%. When the quantity of physical blocks included in the super block for the critical request is larger, and the quantity of physical blocks included in the super block for the non-critical request is smaller, the probability that the critical request is blocked is lower.

TABLE 1

Table of the probability that the critical request is blocked under different capacity ratios of the section

| | Probability | Capacity of the section configured for the critical request | | | |
|---|---|---|---|---|---|
| | | 1 | 2 | 3 | 4 |
| Capacity of the section configured for the non-critical request | 1 | 100% | 50% | 33.3% | 25% |
| | 2 | — | 100% | 66.7% | 50% |
| | 3 | — | — | 100% | 70% |
| | 4 | — | — | — | 100% |

In a feasible implementation, managing, based on the configured capacity of the section, the logical address space corresponding to the memory includes: determining E configured sections from the logical address space corresponding to the memory, where the E configured sections respectively correspond to E super blocks in the memory; and indieating the processor to reclaim data in the E super blocks to F idle super blocks, where E is greater than F, and E and F are positive integers.

After the capacity of the section in the file system is configured based on the type of the target data and/or the parameter of the memory, the file system may manage, based on the configured capacity of the section, the logical address space corresponding to the memory. A management process may include: dividing the logical address space corresponding to the memory by using the configured capacity of the section as a unit, and indicating the memory to perform garbage collection in units of super blocks, to release an idle super block in the memory. The capacity of the super block in the memory is the same as the configured capacity of the section.

Specifically, after the logical address space corresponding to the memory is divided based on the configured capacity of the section, the E configured sections may be determined from the logical address space corresponding to the memory, and E logical addresses respectively corresponding to the E configured sections are sent to the memory. Then, the memory is indicated to map the E logical addresses to E physical addresses respectively. The E physical addresses correspond to the E super blocks in the memory. Finally, valid data in the E super blocks is migrated to the F idle super blocks, to release the E super blocks. E is greater than F. Both E and F are positive integers.

From the perspective of technical effects, the capacity of the section in the file system is configured, and in a process in which the memory performs GC based on the capacity of the section, when the quantity of physical blocks corresponding to the configured capacity of the section in the file system is less than the quantity of dies, compared with the conventional technology in which the quantity of physical blocks corresponding to the capacity of the section is equal to the quantity of dies, when a same quantity of idle super blocks are released, in this embodiment of this application, a quantity of times of valid data migration may be reduced by reducing the capacity of the super block in the memory. Alternatively, when a same amount of valid data is migrated, in this embodiment of this application, because the capacity of the super block is small, more super blocks may be released, that is, efficiency of releasing a redundant block in the GC process is improved. In this way, the overall performance is improved.

Figure 6:
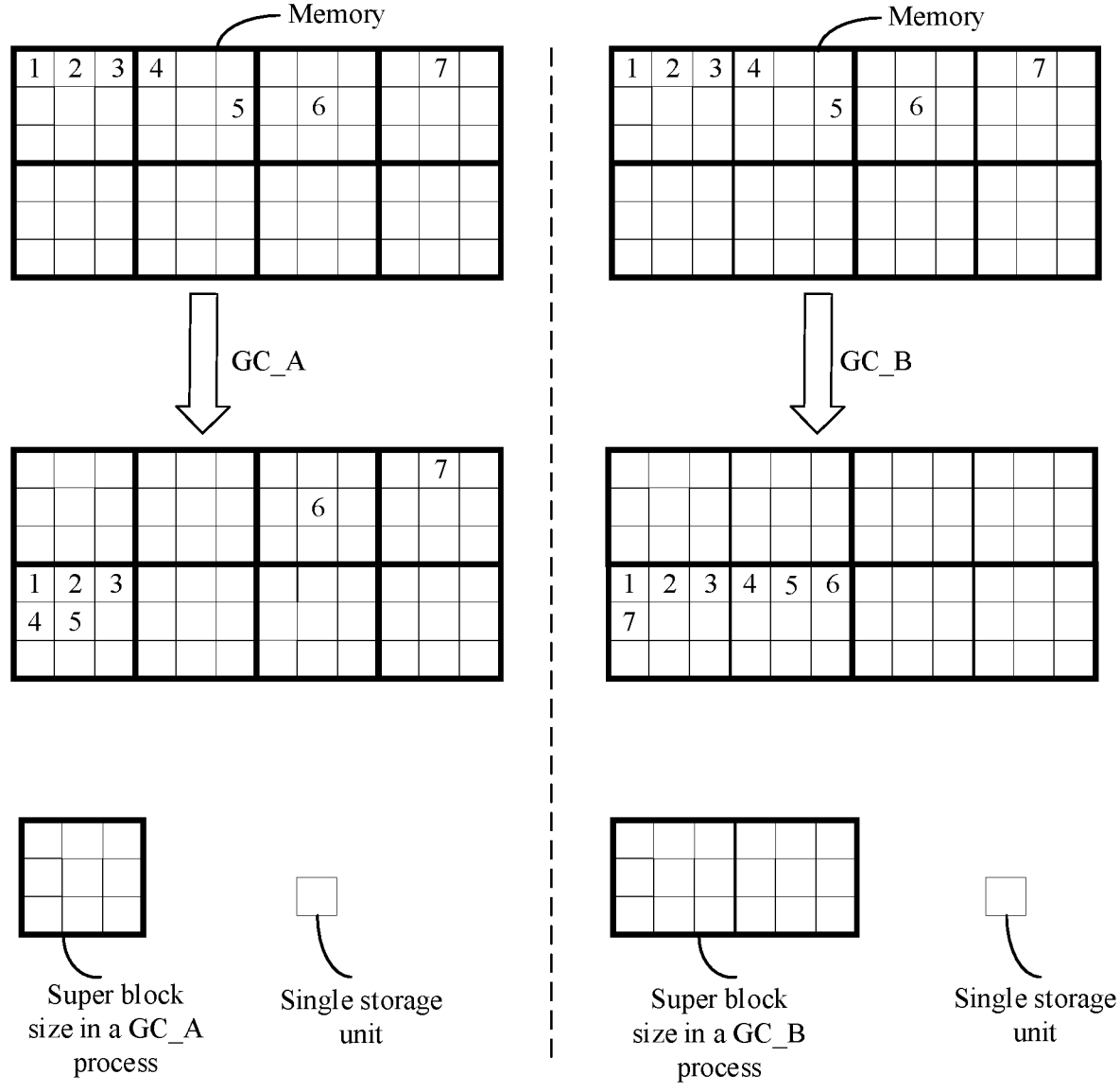
FIG. 6 is a schematic diagram of a garbage collection GC process according to an embodiment of this application.

FIG. 6 is a schematic diagram of the garbage collection GC process according to an embodiment of this application. As shown in FIG. 6, comparison is performed to obtain a difference between quantities of times of valid data migration and a difference between idle super block release efficiency in cases of different super block sizes (that is, different configured capacities of the section).

In a garbage collection process GC_A, the super block corresponding to the configured capacity of the section includes nine storage units. The memory includes eight super blocks. Data stored in storage units 1 to 7 is valid data. When two idle super blocks need to be released, the memory needs to reclaim valid data in the storage unit 1, a storage unit 2, a storage unit 3, a storage unit 4, and a storage unit 5 to one idle super block. When the valid data stored in the storage units 1 to 7 needs to be reclaimed, four idle super blocks may be released.

In a garbage collection process GC_B, a size of the super block corresponding to the configured capacity of the section in the file system is 18 storage units. The memory includes four super blocks. Data stored in storage units 1 to 7 is valid data. When two idle super blocks need to be released, the memory needs to reclaim the valid data in the storage units 1 to 7 to one idle super block. When the valid data stored in the storage units 1 to 7 needs to be reclaimed, two idle super blocks are released.

A size of storage space of each storage unit may be limited by a specific scenario, and is not limited in this application.

In conclusion, compared with a case in which the capacity of the super block is large, in a case in which the capacity of the super block is small, less valid data needs to be migrated to release a same quantity of idle super blocks in the GC reclamation process, or more idle super blocks are released when a same amount of valid data is migrated. It is easy to understand that in this embodiment of this application, in a read/write scenario at the end of capacity or with a low performance requirement, the file system may configure a small capacity for each section, that is, each super block corresponds to a small capacity, so that the overall performance of the computer device is effectively improved.

In a feasible implementation, managing, based on the configured capacity of the section, the logical address space corresponding to the memory includes: determining K configured sections from the logical address space corresponding to the memory, where the K configured sections respectively correspond to K super blocks in the memory; and indicating the memory to write the target data into the K super blocks, where K is a positive integer.

After the capacity of the section in the file system is configured based on the type of the target data and/or the parameter of the memory, the logical address space corresponding to the memory may be managed based on the configured capacity of the section. A management process includes: dividing the logical address space corresponding to the memory by using the configured capacity of the section as a unit, and indicating the memory to perform data read/write in units of super blocks. The capacity of the super block in the memory is the same as the configured capacity of the section.

Specifically, after the logical address space corresponding to the memory is divided based on the configured capacity of the section, the K configured sections may be determined from the logical address space corresponding to the memory, and the target data and K logical addresses respectively corresponding to the K configured sections are sent to the memory. The memory is indicated to map the K logical addresses to K physical addresses respectively. The K physical addresses correspond to the K super blocks in the memory. Finally, the target data is written into the K super blocks. K is a positive integer.

From the perspective of technical effects, the capacity of the section in the file system is configured, and the memory performs a process of writing the target data based on the capacity of the section. When writing the target data is a critical request that is inserted, it may be learned from the foregoing embodiment that in this embodiment of this application, a blocking probability during writing of the target data may be reduced.

Figure 7:
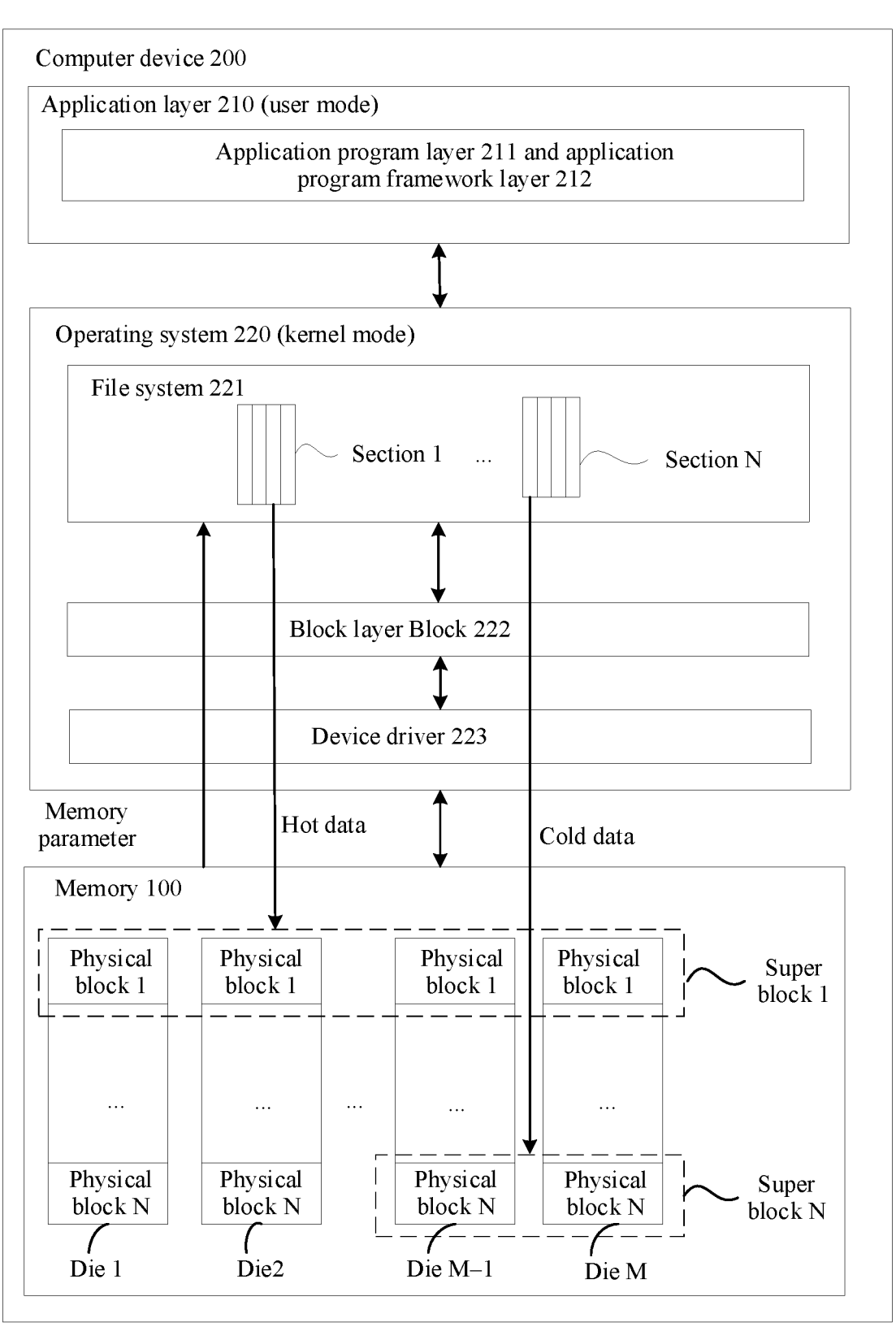
FIG. 7 is a schematic block diagram of another system architecture according to an embodiment of this application.

FIG. 7 is a schematic block diagram of another system architecture according to an embodiment of this application, as a supplement and refinement to the system architecture shown in FIG. 2.

The following describes in detail, by using FIG. 7 as an example, a process such as data read/write in the user mode/application layer 210, the kernel mode/operating system 220, and the memory 100 of the computer device 200. The application program layer 211 first initiates a first read/write request. Data corresponding to the first read/write request is hot data. In this case, the file system 221 receives the first read/write request, and obtains a memory parameter. The file system determines, based on the memory parameter, whether the memory is at an end of capacity. If the memory is not at the end of capacity at this time, the file system 221 configures the capacity of the section based on a data type corresponding to the first read/write request. In this case, the data type is hot data, so that the file system may configure the capacity of the section large (for example, a section 1 shown in FIG. 7), to meet a performance requirement of the hot data. In this case, a logical address space corresponding to the section 1 corresponds to a super block 1 in the memory. The super block 1 includes M physical blocks. The block layer 222 distributes the first read/write request. The device driver 223 encapsulates the first read/write request, and sends the first read/write request and a logical address corresponding to the section 1 to the memory 100. The memory 100 receives the first read/write request and the logical address corresponding to the section 1, decapsulates the first read/write request, and maps the logical address corresponding to the section 1 to a corresponding first physical address. The first physical address corresponds to the super block 1. The memory performs a corresponding data read/write operation on the super block 1 based on the first physical address and the first read/write request.

The application program layer 211 may further initiate a second read/write request. Data corresponding to the second read/write request is cold data. In this case, the file system 221 receives the second read/write request, and obtains a memory parameter. The file system determines, based on the memory parameter, whether the memory is at the end of capacity. If the memory is at the end of capacity at this time, the file system 221 may configure the capacity of the section small (for example, a section N shown in FIG. 7), to release as many idle super blocks as possible to improve the overall performance. In this case, a logical address space corresponding to the section N corresponds to a super block N in the memory. The super block N includes two physical blocks. The block layer 222 distributes the second read/write request. The device driver 223 encapsulates the second read/write request, and sends the second read/write request and a logical address corresponding to the section N to the memory 100. The memory 100 receives the second read/write request and the logical address corresponding to the section N, decapsulates the second read/write request, and maps the logical address corresponding to the section N to a corresponding second physical address. The second physical address corresponds to the super block N. The memory performs a corresponding data read/write operation on the super block N based on the second physical address and the second read/write request.

Figure 8:
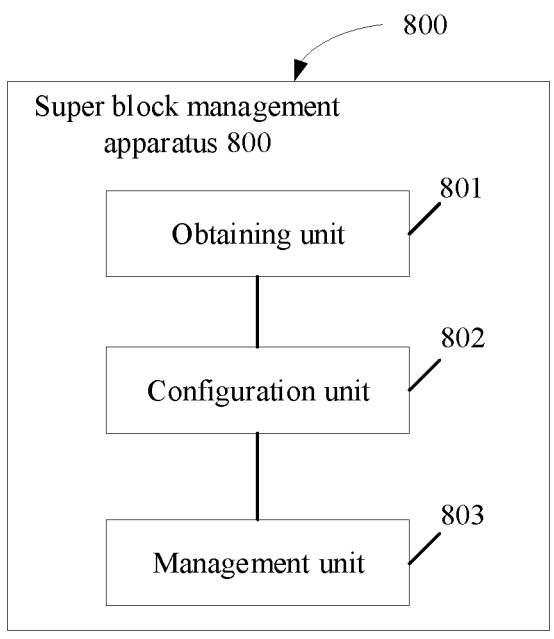
FIG. 8 is a schematic diagram of a structure of a super block management apparatus according to an embodiment of this application.

FIG. 8 is a schematic diagram of a structure of a super block management apparatus according to an embodiment of this application. As shown in FIG. 8, the apparatus 800 includes:

an obtaining unit 801, configured to obtain a parameter of a memory and a type of target data, where the target data is data to be written into the memory;

a configuration unit 802, configured to configure a capacity of a section in a file system based on the type of the target data and/or the parameter, where the section is a logical address space management unit in the file system, and the configured capacity of the section matches a capacity of a super block in the memory; and a management unit 803, configured to manage, based on the configured capacity of the section, a logical address space corresponding to the memory.

In a feasible implementation, the memory includes at least one die (die). Each of the at least one die includes at least one physical block. The super block is a management unit in the memory. The super block includes at least one physical block. Each of the at least one physical block is located on a different die.

In a feasible implementation, the parameter includes a quantity of idle super blocks in the memory and a quantity of dies. When the quantity of idle super blocks is less than or equal to a preset quantity, a quantity of physical blocks, in the memory, corresponding to the configured capacity of the section is less than the quantity of dies.

In a feasible implementation, the parameter includes a quantity of idle super blocks in the memory and a quantity of dies. When the quantity of idle super blocks is greater than a preset quantity, a quantity of physical blocks, in the memory, corresponding to the configured capacity of the section is less than or equal to the quantity of dies.

In a feasible implementation, the management unit is specifically configured to: determine E configured sections from the logical address space corresponding to the memory, where the E configured sections respectively correspond to E super blocks in the memory; and indicate a processor to reclaim data in the E super blocks to F idle super blocks, where E is greater than F, and E and F are positive integers.

In a feasible implementation, the management unit is specifically configured to: determine K configured sections from the logical address space corresponding to the memory, where the K configured sections respectively correspond to K super blocks in the memory; and indicate the memory to write the target data into the K super blocks, where K is a positive integer.

It should be understood that for a specific running process of the super block management apparatus in this embodiment of this application, refer to a corresponding process in the foregoing method embodiment. Details are not described herein again.

Figure 9:
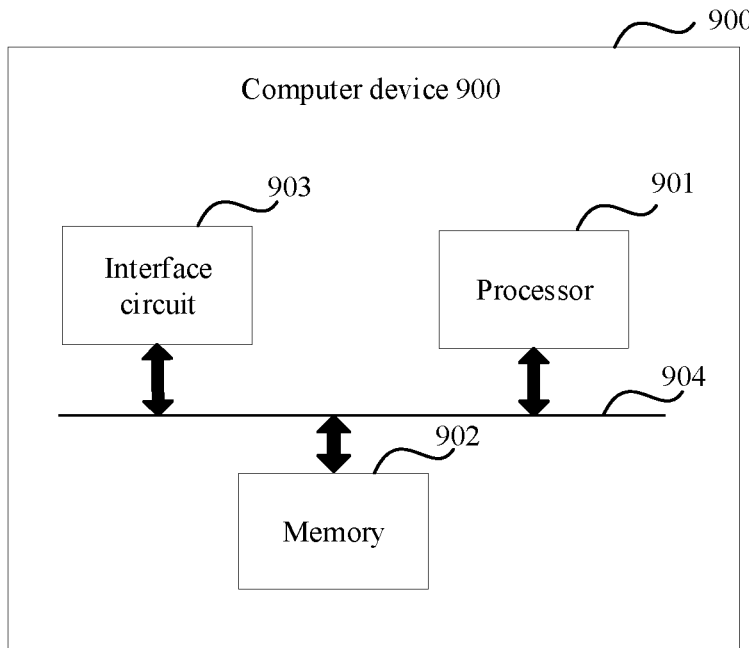
FIG. 9 is a schematic diagram of a hardware structure of a computer device according to an embodiment of this application.

FIG. 9 is a schematic diagram of a hardware structure of a computer device according to an embodiment of this application. The device 900 includes a processor 901, a memory 902, an interface circuit 903, and a bus 904.

The processor 901 is configured to: obtain a parameter of the memory 902 and a type of target data through the interface circuit 903, where the target data is data to be written into the memory; configure a capacity of a section in a file system based on the type of the target data and/or the parameter, where the section is a logical address space management unit in the file system, and the configured capacity of the section matches a capacity of a super block in the memory; and manage, based on the configured capacity of the section, a logical address space corresponding to the memory.

The processor 901, the memory 902, and the interface circuit 903 perform data transmission through the bus 904.

In a feasible implementation, the memory includes at least one die (die). Each of the at least one die includes at least one physical block. The super block is a management unit in the memory. The super block includes at least one physical block. Each of the at least one physical block is located on a different die.

In a feasible implementation, the parameter includes a quantity of idle super blocks in the memory and a quantity of dies. When the quantity of idle super blocks is less than or equal to a preset quantity, a quantity of physical blocks, in the memory, corresponding to the capacity of the section is less than the quantity of dies.

In a feasible implementation, the parameter includes a quantity of idle super blocks in the memory and a quantity of dies. When the quantity of idle super blocks is greater than a preset quantity, a quantity of physical blocks, in the memory, corresponding to the configured capacity of the section is less than or equal to the quantity of dies.

In a feasible implementation, in the aspect of managing, based on the configured capacity of the section, the logical address space corresponding to the memory, the processor is specifically configured to determine E configured sections from the logical address space corresponding to the memory. The E configured sections respectively correspond to E super blocks in the memory. The memory is configured to reclaim data in the E super blocks to F idle super blocks. E is greater than F. E and F are positive integers.

In a feasible implementation, in the aspect of managing, based on the configured capacity of the section, the logical address space corresponding to the memory, the processor is specifically configured to determine K configured sections from the logical address space corresponding to the memory. The K configured sections respectively correspond to K super blocks in the memory. The memory is configured to write the target data into the K super blocks. K is a positive integer.

It should be understood that for a specific running process of the processor and the memory of the computer device in this embodiment of this application, refer to a corresponding process in the foregoing method embodiment. Details are not described herein again.

This application provides a computer-readable storage medium. The computer-readable storage medium stores program instructions. When the program instructions run on one or more processors, some or all of the steps in the foregoing super block management method are implemented.

This application provides a computer program product. When the computer program product runs on a computer device, some or all of the steps in the foregoing super block management method are implemented.

In the foregoing embodiments, descriptions of each embodiment have different focuses. For a part that is not described in detail in an embodiment, refer to related descriptions of other embodiments. It should be noted that for case of description, the foregoing method embodiments are described as a series of combinations of actions. However, persons skilled in the art should be aware that this application is not limited to the described order of the actions, because some steps may be performed in another order or simultaneously according to this application. In addition, persons skilled in the art should also aware that all embodiments described in this specification are example embodiments, and the related actions and modules are not necessarily mandatory to this application.

In the several embodiments provided in this application, it should be understood that the disclosed apparatus may be implemented in other manners. For example, the described apparatus embodiment is merely an example. For example, division of the units is merely logical function division, and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical or other forms.

The foregoing units described as separate parts may or may not be physically separate, and parts displayed as units may or may not be physical units, may be located at one location, or may be distributed on a plurality of network units. Some or all of the units may be selected based on actual requirements to achieve the objective of the solution of this embodiment.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in embodiments of this application.

What is claimed is:

1. A method for super block management, wherein the method comprises:

obtaining a parameter of a memory and a type of target data, wherein the target data is data to be written into the memory;

configuring a capacity of a section in a file system based on at least one of the type of the target data or the parameter of the memory, wherein the file system is separate from the memory, the section is a logical address space management unit in the file system, and the configured capacity of the section matches a capacity of a super block in the memory, wherein the memory comprises at least one die, and each of the at least one die comprises at least one physical block; and the super block is a management unit in the memory, the super block comprises at least one physical block, and each of the at least one physical block is located on a different die, and wherein the parameter comprises a quantity of idle super blocks in the memory and a quantity of dies; and at least one of the following is true:

when the quantity of idle super blocks is less than or equal to a preset quantity, a quantity of physical blocks, in the memory, corresponding to the configured capacity of the section is less than the quantity of dies; or when the quantity of idle super blocks is less than or equal to a preset quantity, a quantity of physical blocks, in the memory, corresponding to the configured capacity of the section is less than the quantity of dies; and managing, based on the configured capacity of the section, a logical address space corresponding to the memory.

2. The method according to claim 1, wherein the managing, based on the configured capacity of the section, a logical address space corresponding to the memory comprises:

determining E configured sections from the logical address space corresponding to the memory, wherein the E configured sections respectively correspond to E super blocks in the memory; and indicating a processor to reclaim data in the E super blocks to F idle super blocks, wherein E is greater than F, and E and F are positive integers.

3. The method according to claim 1, wherein the managing, based on the configured capacity of the section, a logical address space corresponding to the memory comprises:

determining K configured sections from the logical address space corresponding to the memory, wherein the K configured sections respectively correspond to K super blocks in the memory; and indicating the memory to write the target data into the K super blocks, wherein K is a positive integer.

4. A device, comprising at least one processor and at least one memory coupled to the at least one processor, wherein the at least one memory stores program instructions for execution by the at least one processor to cause the device to perform operations comprising:

obtaining a parameter of the at least one memory and a type of target data, wherein the target data is data to be written into the at least one memory;

configuring a capacity of a section in a file system based on at least one of the type of the target data or the parameter of the at least one memory, wherein the file system is separate from the at least one memory, the section is a logical address space management unit in the file system, and the configured capacity of the section matches a capacity of a super block in the at least one memory, wherein the memory comprises at least one die, and each of the at least one die comprises at least one physical block; and the super block is a management unit in the memory, the super block comprises at least one physical block, and each of the at least one physical block is located on a different die, and wherein the parameter comprises a quantity of idle super blocks in the memory and a quantity of dies; and at least one of the following is true:

when the quantity of idle super blocks is less than or equal to a preset quantity, a quantity of physical blocks, in the memory, corresponding to the configured capacity of the section is less than the quantity of dies; or when the quantity of idle super blocks is less than or equal to a preset quantity, a quantity of physical blocks, in the memory, corresponding to the configured capacity of the section is less than the quantity of dies; and managing, based on the configured capacity of the section, a logical address space corresponding to the at least one memory.

5. The device according to claim 4, wherein managing, based on the configured capacity of the section, the logical address space corresponding to the at least one memory comprises:

determining E configured sections from the logical address space corresponding to the at least one memory, wherein the E configured sections respectively correspond to E super blocks in the at least one memory; and indicating the at least one processor to reclaim data in the E super blocks to F idle super blocks, wherein E is greater than F, and E and F are positive integers.

6. The device according to claim 4, wherein managing, based on the configured capacity of the section, the logical address space corresponding to the at least one memory comprises:

determining K configured sections from the logical address space corresponding to the at least one memory, wherein the K configured sections respectively correspond to K super blocks in the at least one memory; and indicating the at least one memory to write the target data into the K super blocks, wherein K is a positive integer.

7. A chip system, wherein the chip system comprises at least one processor, at least one memory, and an interface circuit; the at least one memory, the interface circuit, and the at least one processor are connected to each other through a line; and the at least one memory stores program instructions for execution by the at least one processor to cause the chip system to perform operations comprising:

obtaining a parameter of the at least one memory and a type of target data, wherein the target data is data to be written into the at least one memory;

configuring a capacity of a section in a file system based on at least one of the type of the target data or the parameter of the at least one memory, wherein the file system is separate from the at least one memory, the section is a logical address space management unit in the file system, and the configured capacity of the section matches a capacity of a super block in the at least one memory, wherein the memory comprises at least one die, and each of the at least one die comprises at least one physical block; and the super block is a management unit in the memory, the super block comprises at least one physical block, and each of the at least one physical block is located on a different die, and wherein the parameter comprises a quantity of idle super blocks in the memory and a quantity of dies; and at least one of the following is true:

when the quantity of idle super blocks is less than or equal to a preset quantity, a quantity of physical blocks, in the memory, corresponding to the configured capacity of the section is less than the quantity of dies; or when the quantity of idle super blocks is less than or equal to a preset quantity, a quantity of physical blocks, in the memory, corresponding to the configured capacity of the section is less than the quantity of dies; and managing, based on the configured capacity of the section, a logical address space corresponding to the at least one memory.

8. The chip system according to claim 7, wherein the managing, based on the configured capacity of the section, a logical address space corresponding to the at least one memory comprises:

determining E configured sections from the logical address space corresponding to the at least one memory, wherein the E configured sections respectively correspond to E super blocks in the at least one memory; and indicating the at least one processor to reclaim data in the E super blocks to F idle super blocks, wherein E is greater than F, and E and F are positive integers.

9. The chip system according to claim 7, wherein the managing, based on the configured capacity of the section, a logical address space corresponding to the at least one memory comprises:

determining K configured sections from the logical address space corresponding to the at least one memory, wherein the K configured sections respectively correspond to K super blocks in the at least one memory; and indicating the at least one memory to write the target data into the K super blocks, wherein K is a positive integer.

10. A non-transitory computer-readable storage medium, wherein the non-transitory computer-readable storage medium stores program instructions for execution by at least one processor of a device to cause the device to perform operations comprising:

obtaining a parameter of a memory and a type of target data, wherein the target data is data to be written into the memory;

configuring a capacity of a section in a file system based on at least one of the type of the target data or the parameter of the memory, wherein the file system is separate from the memory, the section is a logical address space management unit in the file system, and the configured capacity of the section matches a capacity of a super block in the memory, wherein the memory comprises at least one die, and each of the at least one die comprises at least one physical block; and the super block is a management unit in the memory, the super block comprises at least one physical block, and each of the at least one physical block is located on a different die, and wherein the parameter comprises a quantity of idle super blocks in the memory and a quantity of dies; and at least one of the following is true:

when the quantity of idle super blocks is less than or equal to a preset quantity, a quantity of physical blocks, in the memory, corresponding to the configured capacity of the section is less than the quantity of dies; or when the quantity of idle super blocks is less than or equal to a preset quantity, a quantity of physical blocks, in the memory, corresponding to the configured capacity of the section is less than the quantity of dies; and managing, based on the configured capacity of the section, a logical address space corresponding to the memory.

11. The non-transitory computer-readable storage medium according to claim 10, wherein the managing, based on the configured capacity of the section, a logical address space corresponding to the memory comprises:

determining E configured sections from the logical address space corresponding to the memory, wherein the E configured sections respectively correspond to E super blocks in the memory; and indicating the at least one processor to reclaim data in the E super blocks to F idle super blocks, wherein E is greater than F, and E and F are positive integers.

12. The non-transitory computer-readable storage medium according to claim 10, wherein the managing, based on the configured capacity of the section, a logical address space corresponding to the memory comprises:

determining K configured sections from the logical address space corresponding to the memory, wherein the K configured sections respectively correspond to K super blocks in the memory; and indicating the memory to write the target data into the K super blocks, wherein K is a positive integer.

* * * * *